Figure 1:
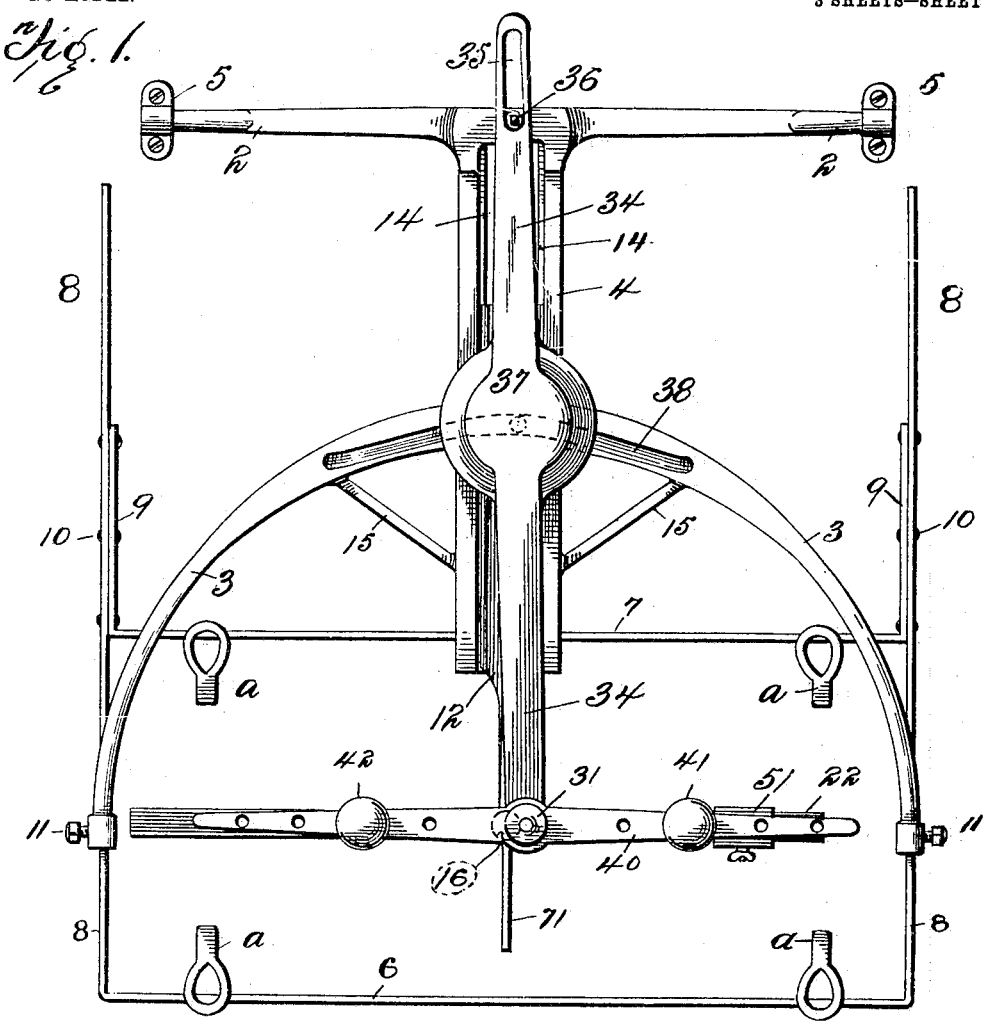

No. 766,158. PATENTED JULY 26, 1904.
F. W. STARR.
MACHINE FOR CUTTING CURVES.
APPLICATION FILED MAR. 31, 1902.
NO MODEL. 3 SHEETS—SHEET 1.

Witnesses
Chas. K. Davies
M. E. Brown

Inventor
F. W. Starr
By W. A. Bartlett
Attorney

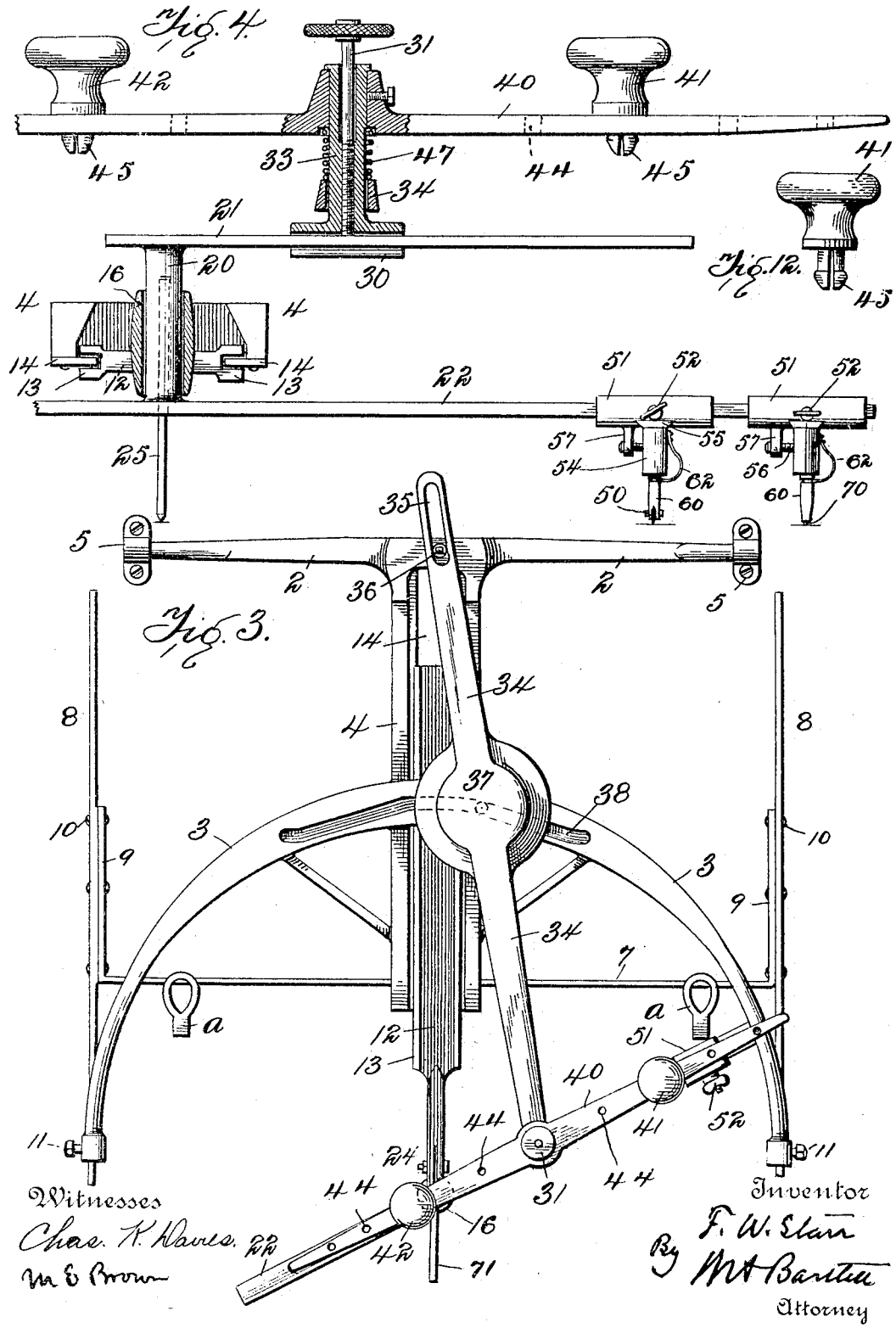

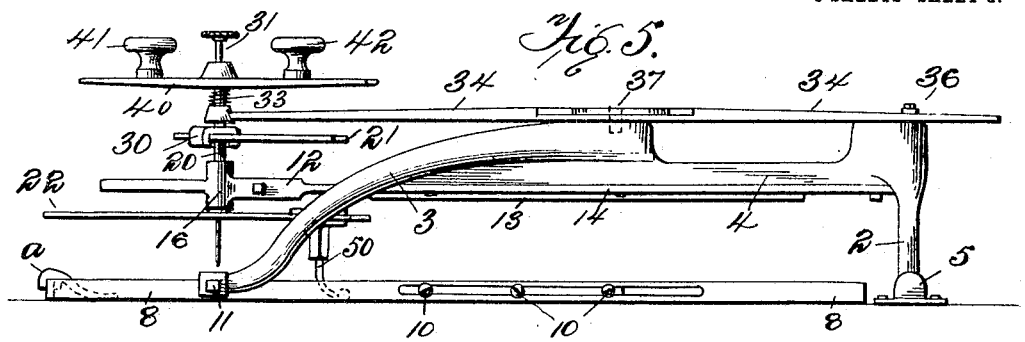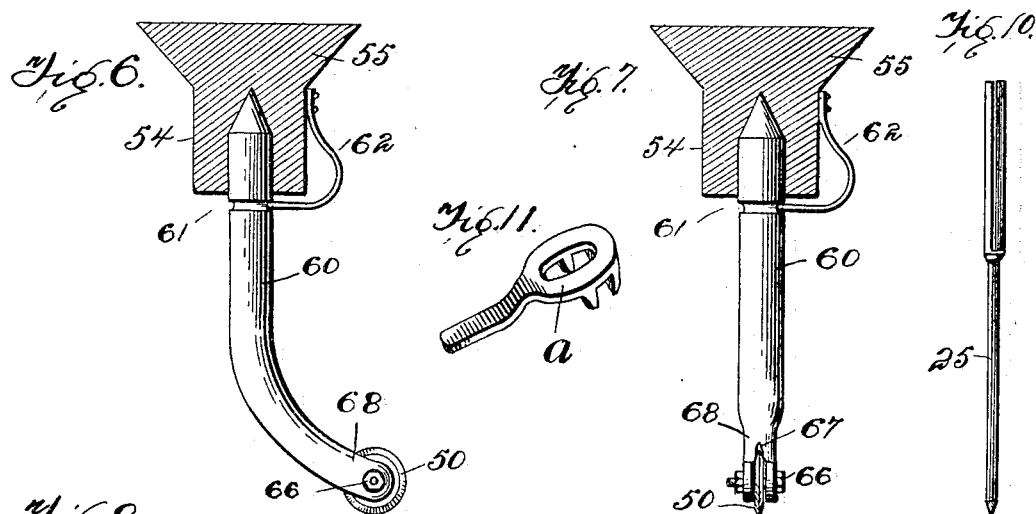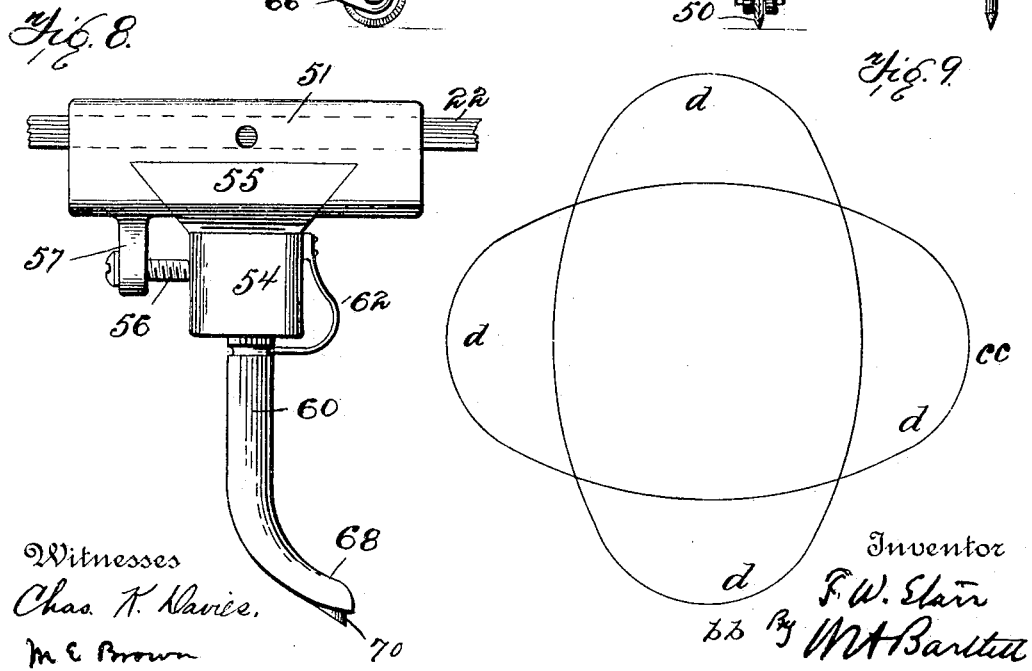

No. 766,158. Patented July 26, 1904.

UNITED STATES PATENT OFFICE.

FERDINAND W. STARR, OF SPRINGFIELD, OHIO.

MACHINE FOR CUTTING CURVES.

SPECIFICATION forming part of Letters Patent No. 766,158, dated July 26, 1904.

Application filed March 31, 1902. Serial No. 100,842. (No model.)

*To all whom it may concern:*

Be it known that I, FERDINAND W. STARR, residing at Springfield, in the county of Clark and State of Ohio, have invented certain new and useful Improvements in Machines for Cutting Curves, of which the following is a specification, reference being had therein to the accompanying drawings.

This invention relates to machines for cutting regularly-curved forms—such as circles, ellipses, and other curved mathematical or predetermined forms—in or from flat plates, such as plate-glass or thin sheets of metal, leather, &c.

The object of the invention is to so suspend and guide the cutter that it may follow the prescribed or predetermined path with certainty and that the operator need not attend to the knife movement at all after the machine has once been set to cut to the prescribed form. The construction of the cutter is such that it is free to follow the line of least resistance, which line is the predetermined curved line which the cutter holder or carrier must follow under the impulse of the machine or which line bears a definite relation to the line of movement of the cutter-carrier.

In my Patent No. 683,809 I illustrate and describe a machine in many of its elements substantially like the present invention. In that patent, however, the cutter claimed is one adapted to cut in inclined or beveled direction only. The present cutter is adapted for cutting in glass or similar substances where no bevel or inclination is necessary and involves the combination of a free trailing cutter with a guided and directed cutter-carrier moving in a predetermined curved path. In the drawings no attempt is made to show the relative proportion of parts. The drawings are explanatory, not working drawings.

Figure 2:
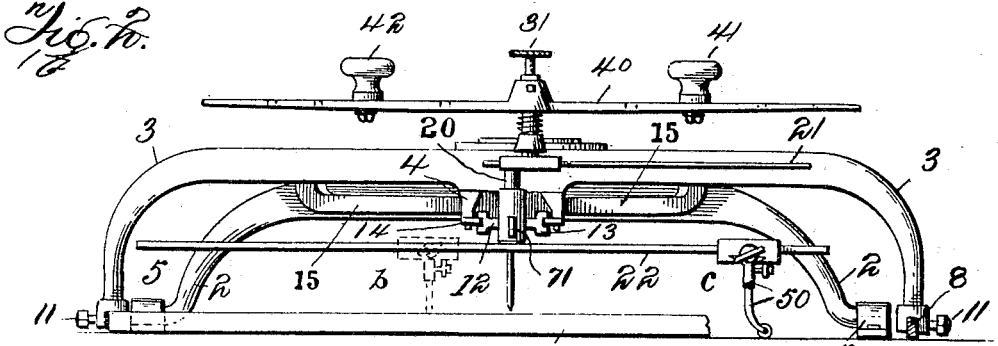

Figure 1 is a plan view showing the general features of a machine adapted to carry and propel a cutter constructed to follow curved lines, as hereinafter explained. Fig. 2 is a front end elevation of the machine, the holding-clamp broken away. Fig. 3 is a plan showing some parts in different position from the position of Fig. 1 and omitting some parts. Fig. 4 is a broken elevation of the operating cutter-carrier, sweep, and lever, parts being shown in section. Fig. 5 is a side elevation of the machine, parts being broken away. Fig. 6 is a vertical section of tool-socket and elevation of trailing cutter carried therein, the cutter itself being a rotating disk. Fig. 7 is a section of tool-socket with cutter shown in elevation in a different position. Fig. 8 is a broken elevation of the cutter and cutter-carrier. Fig. 9 is an approximate plan of figures such as may be cut by the machine with tools in different positions. Fig. 10 is an elevation of the pointer; Fig. 11, a plan of a clamping-bar clip. Fig. 12 is an elevation of the handle.

For convenience in operating my machine I usually make the main frame with four legs 2 2 3 3, which legs are connected to the longitudinal frame-bar or spine 4. The legs 2 3 and spine 4 are preferably integral or at least rigid. The back legs 2 2 may be held to the floor or table on which the machine is supported by clamp-sockets 5 5, in which the ends of the legs pivot and which sockets hold the machine from angular displacement, but permit the raising of the front part of the machine.

The front legs 3 3 of the machine preferably rest on the clamping-frame. This frame has cross-bars 6 7. The cross-bar 6 is connected to side bars 8 8, which extend toward the rear of the machine and on which the legs 3 rest. The cross-bar 7 is connected to side bars 9 9, which extend back inside the bars 8 8. The bars 8 are slotted, and rivets or bolts 10 10 pass through the bars 9 and the slots in the bars 8. The clamping-frame can thus be extended or contracted, so that the bars 6 7 may be placed at such distance apart as may be advisable. These bars serve as clamp-bars to hold down the plate of glass or other material on which the cutter operates. Clips *a a* may be attached to the bars to assist in holding the plate. These clips are simply elastic fingers of metal which clasp the clamp-frame and bear on the sheet or plate to be operated on, especially in case it is unadvisable to place the clamp-frame directly on the work. The clips *a* can be moved to any position on the clamp-frame and hold against the clamp-frame by a slightly elastic or binding action.

The legs 3 are slotted at their lower ends, and the slots in these legs embrace the bars 8 8. A set-screw 11 through the side of the leg engages and holds the clamp-piece 8, so that the front end of the machine may be lifted and the clamp be lifted therewith. This permits the placing of a plate of glass or other material under the clamping-frame, and the weight of the clamp-frame and front of the machine will hold the plate in place. The bottom of clamp-frame bars 6 7 may be padded, if desirable.

The bar or spine 4 is slotted lengthwise, and a bar 12 is free to slide in the slot.

The slide-bar 12 has grooves 13, in which the ribs 14 enter, as shown. These ribs 14 are bolted or otherwise secured on the lower face of the spine 4. The legs 3 extend above and across the spine 4 and are connected thereto by braces 15 in the construction illustrated. (See Figs. 1, 2, and 3.) The frame may be of cast metal and should be strong enough to prevent vibration under normal conditions.

The front end of bar 12 has a vertical socket or guideway 16, through which the sweep spindle or shaft 20 extends. The shaft 20 has rigid bars 21 and 22 connected to its opposite ends and rigid with said shaft, said bars 21 and 22 and the spindle or shaft 20 forming what I have termed the "sweep."

The bar 12 may be split for a little distance behind the socket or shaft 20, and a bolt 24, passing through the split portion, serves to tighten the socket onto shaft 20 to take up wear and prevent play of the parts and to apply more or less friction to the shaft, which both slides and turns in the socket or way.

The bar 22 is the cutter-carrier bar, and its function will be explained hereinafter. The bar 21 is the actuating-bar, and its connection to bar 22 through shaft 20 insures that both bars 21 and 22 will move together.

Directly under spindle 20 there is a pointer 25, which pointer is held by friction in a round hole in and concentric with shaft 20, and the pointer may be more or less projected from said shaft. A rod split at the upper end so that the split portion is elastic makes a good pointer. Pointer 25 is generally extended or drawn down merely for centering the work and is then pushed up in its socket, while the cutting proceeds.

Now it will be quite clear to a skilled mechanic that if the pointer 25 be placed over any point on a plate of glass or other material and the slide 12 held in place a cutter or marker 50, fixed on bar 22, will cut or mark a circle of which the pointer 25 will be the center when bar 22 is swung round.

The upper bar 21 of the sweep has a sliding clasp 30 thereon. This sliding clasp 30 is formed, as best shown in Fig. 4, to embrace the edges of bar 21, but is open at the bottom, so that it can slide directly over the shaft 20. A set-screw 31 passes through a threaded opening in the clasp 30, and by adjusting the set-screw clasp 30 may be fixed in any desirable position on bar 21, and then becomes rigid with said bar.

The clasp 30 has an upwardly-projecting shaft 33, which shaft passes through a bearing in the guide or sway bar 34.

Sway-bar 34 lies on top of the frame and extends to the rear of the machine. This sway-bar has a slot 35 through its rear end, which slot embraces a fixed pin 36 on the top of the frame, and the sway-bar is guided by said pin and slot so that the sway-bar may move in the direction of its length relatively to said fixed pin.

The sway-bar 34 has a downwardly-projecting pin 37, which pin enters a groove 38 in the top of the frame. This groove 38 has a slightly-curved passage which inclines forward in the upper faces of legs 3 at both sides of the center of the frame, the inclination and curve being such as to project the front end of bar 34 to the front when the pin 37 is swung sidewise by a side movement of the front end of the sway-bar. The resultant of these movements is a right-line movement of the front or guiding end of the sway-bar. The form of the guide-groove 38 is such as to produce a movement of the center of spindle 33 directly at right angles to the movement of slide-bar 12 and shaft 20 carried therein. The shaft 33 thus travels in a way at right angles to the travel of shaft 20, and, as will be shown, spindle 33 may move vertically in its way.

The spindle 33, passing through the bearing in sweep 34, has a handle-lever 40 rigidly attached thereto. This lever 40 has handles 41 and 42 attached at a suitable distance apart to give a fair leverage in operating the machine.

The lever or bar 40 has a number of holes 44 therein, in any one of which holes the stem 45 of handles 41 42 may be inserted. This stem 45 is preferably a split rod tapered toward the end, and this rod may be inserted in any hole in bar 40 and will be retained there by friction until lifted out. The handles 40 41 may thus be readily adjusted to such position on bar or lever 40 as to give convenient leverage. The hands of the operator taking hold of one or both handles swing the bar 40 around on its shaft or spindle, thus causing the cutter to follow its predetermined curve.

As bar 40 is attached rigidly when in operation to shaft 33 and is held up by spring 47 bearing on the sliding sway-bar, a downward pressure on the handles 41 42 presses down bar 40 and shaft 33 in the guideway near the end of sway-bar 34. This carries down also bar 21, shaft 20, and bar 22 and of course the cutter or cutters carried on bar 22. The cutter is thus brought to the work, and the needful pressure is applied to cut the required depth. The turning of bar 40 and its shaft 33 causes the tool to travel in the predetermined curved path. By releasing the downward pressure on handles the tools and their carriers are lifted by the action of spring 47.

Now supposing a cutter 50 be attached to sweep-bar 22, if clasp 30 be directly over spindle 20 this cutter 50 will be moved in a circle about pointer 25 if power be applied to handles 41 42 in a direction to turn said bar 40 about its supporting-spindle 33; but if the front end of the sliding sway-bar 34 be swung to one side of the center of the machine when pointer 25 is in the median position—as, for example, in Figs. 3 and 4—a different movement of cutter 50 results, the cutter moving in a curve or series of curves forming an oval or ellipse about the foci common to such ellipse.

Slide 12 and spindle 20 can move longitudinally but not laterally of the machine. The front end of sliding sway or guide bar 34 can move laterally, but not longitudinally. Both being free to move under a moving impulse and the direction of movement of the center of spindle 33 being at a right angle to that of the center of spindle 20, the resulting movement of cutter 50 is an ellipse the eccentricity of which is determined by the distance of the center of spindle 33 to the side of spindle 20.

In practice I find that a cutter carried by a carrier which is controlled by a longitudinally-sliding bar and a laterally-moving guide or sway bar moves with greater smoothness and with less friction than if the cutter were guided on two fixed bars, which is due to the pivotal arrangement of axis 33, held up by spring 47 on the sway-bar 34; but as the movement of spindle 33 must be exactly at right angles to that of spindle 20 in order to produce regular ovals or ellipses other mechanism may for same purposes be substituted for the slide-bar and sway-bar shown. I have also found that in order to produce satisfactory results in cutting curved figures the cutter must be free to swing or swivel and adjust itself automatically to the curved outline. This is effected by causing the cutter, which preferably cuts with a draw cut, to trail and follow after the tool-stem or tool-carrier. Then when the stem or carrier is forced to follow a given curved outline, as a circle or an ellipse, the cutting edge or point is protected by seeking the shortest line of least resistance and will therefore follow such a curve, so as to throw the least strain on the cutter and on the work, and on sheets of glass, paper, &c., will cut smoothly, when any other form of cutter known to me in such outlining will plow up or nick or notch and on glass will break or scratch the material and ruin the cutter.

Cutter 50 is what I call a "trailing" cutter. The cutter-carrier 51 is a slide piece or head adjustable on bar 22 and held at any adjusted distance by set-screw 53.

The tool-socket 54 is attached to a dovetail head 55, which head slides in a dovetail groove in the lower part of carrier 51. The socket 55 may be held by a set-screw 56, passing through a lug 57 on the carrier 51 and bearing against the tool-socket.

The tool-stem 60 is cylindrical at its upper end and enters a vertical cylindrical hole in the bottom of the tool-socket, fitting neatly therein and being free to turn in said hole or socket. The tool-stem may have a groove 61 near its upper end, and a spring 62, attached to tool-socket 54, may enter said groove in the tool-stem to hold the tool from falling out of its socket; but this is not essential, as the tool will generally be held by friction sufficiently to prevent its dropping out when the machine is lifted, and when the tool is in operation on the plate or sheet of glass or other material the weight of the parts bearing on the tool-carrier will hold the tool-stem in its socket.

I show two forms of trailing cutters, both of which may be used simultaneously or successively in cutting plates of glass or other flat plates. The cutter 50 is a disk of chrome steel or other excessively-hard material carried on an axis 66, which axis crosses a slot 67 at the lower end of the bent stem or gooseneck 68.

The stem 60 stands vertically in the socket 54. The gooseneck 68 bends to one side of this vertical stem. Hence the rotary cutter 50 trails after the socket and stem, and as the stem is free to turn in its socket this trailing cutter seeks the shortest line or line of least resistance and automatically changes direction to cut in the curve which is the resultant of the positions of the sweep, the cutter-carrier, the sway-bar, and the slide-bar.

The tool-stem 60, with gooseneck 68, may carry a diamond-point or similar scratch cutter 70, the trailing action of such cutter being similar to that of the disk 50.

In cutting rings two cutters may be mounted side by side on bar 22, one of these being a rotary and the other a scratch cutter, as shown in Fig. 4. Then by turning the sweep a ring or an elliptical form can be cut from the glass plate by a single traversing cut of the trailing cutters.

As the trailing cutter need not exactly follow the center of the stem 60, but on a plain surface like a plate of glass will seek the line of least resistance and shortest line of travel, a scale on bar 22 does not serve as an exact gage for the adjustment of the cutters to cut an ellipse. A little experience, however, enables the user to adjust the tool and sway-bar to produce any desired eccentricity of cut and to cut an ellipse of great regularity and any desired degree of eccentricity and with the long axis in either direction relatively to the plate and without moving the plate or sheet of glass.

A hand-lever or handle 71 projects from the front of socket 16 and serves as a convenient means by which to draw slide-bar 12 to position for centering pointer 25 on the work and for lifting the front of the machine to apply new work and remove cut sheets.

Bar 22 is continued at both sides of the shaft 20. If a cutter be attached to said bar at the side remote from the clasp 30, said clasp being at one side of spindle 20—as, for example, at $b$, Fig. 2—the cutter $b$ will make an elliptical cut with its longer axis at right angles to the ellipse, which will be cut with the cutter at $c$, same figure. Thus a compound form (indicated at $b\ b\ c\ c$, Fig. 9) may be cut or marked by the machine, and an opening bounded by lines $d\ d\ d\ d$ may be made with this cutter by two circumferential cuts.

I do not in this application limit all my claims to the particular mechanism for forcing a trailing cutter to move in a predetermined curved line about a center or foci or in other predetermined direction. The mechanism described for compelling the travel of the cutter-stem is quite similar to that described in my patent above referred to; but for the purpose of propelling the cutter-carrier in a predetermined path there are probably many equivalents. The device herein described contains some structural improvements over that described in my patent above referred to. A very important feature of the present invention, however, is found in the trailing cutter free to seek the line of least resistance of cut, but compelled to follow behind the cutter-holder, which is driven in a predetermined path made up of curves.

In cutting curves of long radius, especially on glass, a diamond or draw cutter will generally work to advantage, whereas on curves of short radius a rotary cutter does better work. Consequently I do not desire to limit my claims to one particular variety of trailing cutter when, in fact, two cutters may be used side by side to cut out a single ring or other form, one of these cutters being a rotary and the other a draw cutter, one working near the center and the other at the periphery of the ring or form to be cut.

What I claim is—

1. In a cutting-machine of the character described, the combination of the supporting frame and legs, the clamp-frame on which the front legs rest, and means connecting the clamp-frame to the front legs, so that the frame will be lifted with the legs when the front end of the machine is swung up.

2. In a machine of the character described, the combination of the main frame having supporting-legs and the clamp-frame removably connected to the front legs, said clamp-frame composed of cross-bars and side bars, the side bars of one frame-section being slotted, the side bars of the other frame-section having projections extending into said slots, whereby the clamp-frame may be extended or contracted.

3. The combination with the main frame and the clamp-frame removably connected to the legs thereof, of holding-clips movably and removably attached to the clamp-frame.

4. The combination, in a machine as described, of the supporting-legs, the longitudinally-slotted spine-bar rigid therewith, the slide-bar supporting the sweep-shaft and having side grooves, and the separate ribs secured to the lower face of the slotted spine-bar, and extending into said grooves in the slide-bar, substantially as described.

5. The combination, in a machine for cutting curves, &c., of a rigid frame having a longitudinally-slotted spine, a slide-bar freely moving in said slot and having a socket for the sweep-shaft, the sweep having its shaft in said socket, and means for holding said shaft with greater or less closeness in the socket, substantially as described.

6. The combination of the frame, slide-bar, and sweep having a hollow shaft journaled in a bearing in the slide-bar, of a pointer having its upper end split and extending into the hollow shaft and vertically adjustable therein.

7. The combination of the frame having longitudinally-slotted spine, the slide-bar free to move therein, the sweep having its shaft journaled in the slide-bar, the sway-bar having its rear end guided on the frame and a central pin extending into a groove with curved passage inclining forward from the middle, and a vertically-adjustable shaft on the sweep extending through a bearing on the sway-bar, substantially as described.

8. The combination of the frame, slide-bar, sway-bar, and sweep, constructed and arranged substantially as described, the cutter-carrier adjustable on the cutter-carrying bar, and means for securing the cutter-carrier in adjusted position on said bar.

9. The combination of the vertical tool-socket and means for impelling the same along predetermined curved lines, the vertical tool-stem swiveled and free to rotate in said socket, and the rotating cutter carried on a bent or offset extension of said swiveled tool-stem.

10. The combination with means for actuating a cutter-holding socket along predetermined curved lines, of a tool-stem swiveled in said socket, and a trailing rotary cutter projecting from said stem.

11. The combination with means for moving a tool-socket along predetermined curved lines, of a tool-carrying stem having a vertical portion swiveled to turn freely in said socket, and a bent portion carrying a cutter in trailing position behind said stem.

12. The combination with means for moving a tool-socket along curved lines, of a vertical tool-stem swiveled to turn freely in said socket, a bent extension of said tool-stem having a slot therein, and a rotating disk cutter in said slot and having its axle extending across the slot.

13. The combination with the cutter-bar and means for forcing it to travel in a curved path, of an adjustable cutter-carrier on said bar, a stem swiveled to turn freely in said carrier, and a rotary cutter trailing from said stem.

14. The combination with a tool-carrier and means for forcing it to travel in a predetermined curved path, of a cutting-tool having a cutter trailing from said carrier, and free to follow the path of least resistance.

15. The combination with a cutter-carrier and means for forcing it to move in a curved path, of a stem swiveled to turn freely and automatically with regard to said carrier, and a trailing cutter having its cutting edge behind the center of the stem.

In testimony whereof I affix my signature in presence of two witnesses.

FERDINAND W. STARR.

Witnesses:
G. D. BRINKMAN,
GEO. S. DIAL.